Dec. 31, 1968   E. SCHASCHL   3,418,848
CORROSION TESTING PROBE
Filed Dec. 6, 1965
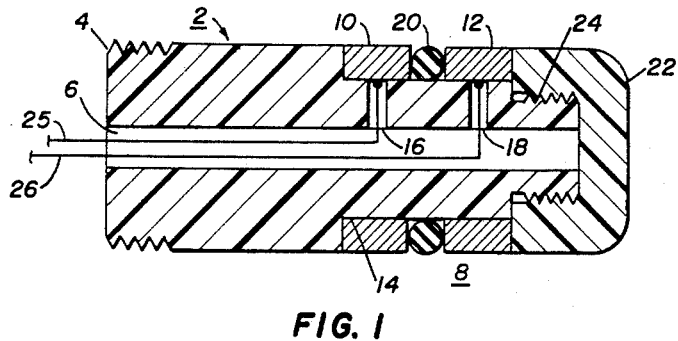
FIG. 1
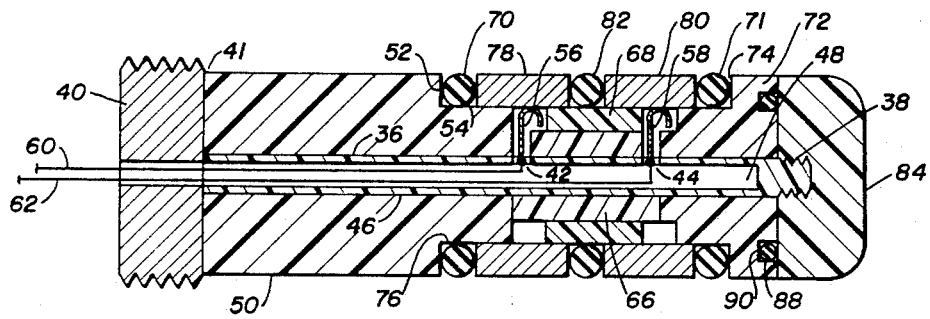
FIG. 3
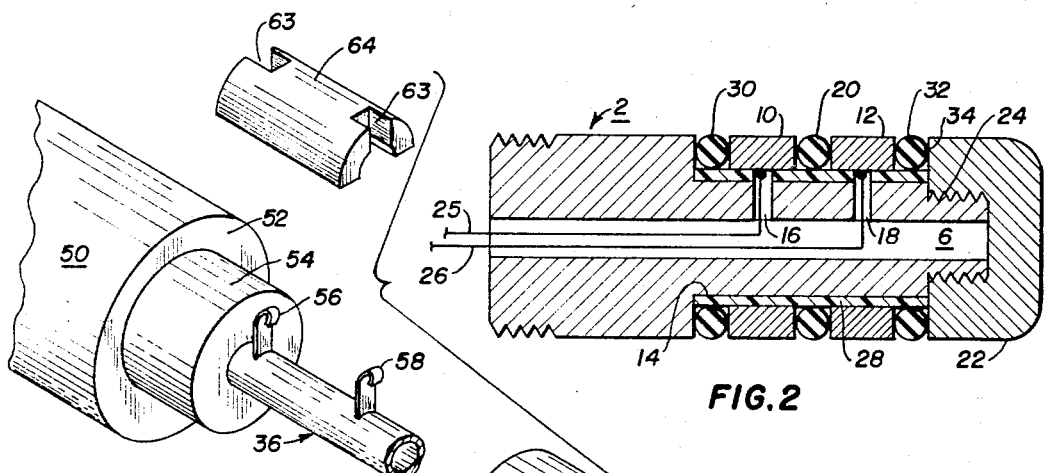
FIG. 4   FIG. 2
INVENTOR.
EDWARD SCHASCHL
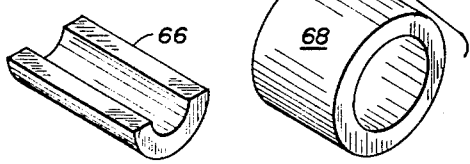
BY
ATTORNEY.

United States Patent Office 3,418,848
Patented Dec. 31, 1968

3,418,848
CORROSION TESTING PROBE
Edward Schaschl, Crystal Lake, Ill., assignor to Union Oil Company of California, Los Angeles, Calif., a corporation of California
Filed Dec. 6, 1965, Ser. No. 511,952
9 Claims. (Cl. 73—86)

ABSTRACT OF THE DISCLOSURE

A corrosion test probe comprising a hollow, tubular base member having a recess on the exterior surface thereof, said tubular base member having apertures communicating the recess surface to the hollow interior, at least two metallic tubular test specimens slidably disposed on the recess surface in registry with said apertures and having interior surface conforming to the exterior configuration of said recess surface to substantially fluid-tightly engage at least a portion of said recess surface so as to isolate same from the corrosive environment, independent electrical conductor means contacting each of the unexposed interior surfaces of the test specimens and communicating into and through the hollow interior of the base member through apertures located in the isolated portion of the recess surface, end means on the terminal portion of the base member to prevent relative longitudinal movement between the base member and the test specimens and to fluid-tightly seal the hollow interior of the base member from the corrosive environment.

---

This invention relates to a corrosion testing probe designed so that the test specimens may be easily mounted on and replaced from the specimens' supporting structure and wherein various types of test specimens may be used in a number of consecutive tests. The invention lies particularly in the configuration and assembly of the supporting means for the test elements and in the arrangement of a test probe as a unit for ready attachment within a corrosive environment for connection to an electrical measuring device as is described in co-pending application Ser. No. 322,281, filed Nov. 8, 1963, wherein one Glenn A. Marsh is the inventor of the invention disclosed therein.

Many of the previous designs of corrosion test probes have necessitated that they be used only once over an extended period of time in that the test elements are so fabricated as a part of the probe structure that disintegration of the test specimens would render the entire probe structure unuseful for further testing. As will be seen from the description of the invention, the present device provides a reusable supporting means adapted to carry test specimens which are readily replaceable onto the supporting means. Hence, the supporting units may support two or more metallic, tubular test specimens and the support members may be reused for an unlimited number of such tests, wherein it is desired to expose at least two test specimens to the same corrosive environment.

Basically, the device of the invention makes use of the method described in the aformentioned co-pending application wherein a current is applied between at least two electrodes while they are immersed in a corrodent. The current passing through one electrode in the positive direction and through the other electrode in the negative direction causes the electrode potentials of the two electrodes to shift apart by a small voltage. The current required to effect this shift is measured. Next, the polarity is reversed and the electrode potentials are caused to shift apart by a known voltage of opposite polarity after which the current is then again measured. The two currents are averaged and the average is applied to a calibration chart to obtain the corrosion rate.

The probe of this invention permits the use of one supporting body with any number of test elements or specimens wherein the specimens may be rapidly mounted or replaced. Thus, the probe permits studies with a variety of different metals, heat treated metals of one alloy or a combination of metals involving galvanic action. The design of the probe allows for easy assembly and low cost fabrication of corrosion test probes.

It becomes, therefore, a primary object of this invention to provide a corrosion test probe to be used with an instantaneous corrosion rate meter adapted to determine the corrosivity of environments accurately and economically.

Another object of this invention is to provide a new form of corrosion test probe having novel means for holding the test elements.

Another object of this invention is to provide a corrosion test probe adapted for reuse with different and various test elements.

Another object of the invention is to provide a corrosion test probe which has a construction permitting the isolation of the electrical lead wires in contact with the test specimens from the corrosive environment.

These and other objects of the invention will become apparent or will be described as the description thereof proceeds wherein FIGURE 1 is a sectional view of one embodiment of the invention;

FIGURE 2 is a sectional view of still another embodiment of the invention;

FIGURE 3 is a sectional view of a preferred apparatus of this invention; and

FIGURE 4 is a partial isometric view of a portion of the apparatus depicted in FIGURE 3.

Referring to the drawing, FIGURE 1 shows a side sectional view of an assembled corrosion test probe wherein the support components of the probe are fabricated of electrically non-conductive materials. The probe comprises annular element 2 having a threaded end 4 which may be screwed into a proper receptacle of the wall of a vessel containing a corrosive environment. Element 2 has a hollow interior 6 and has a smaller diameter at its terminal portion 8 which provides a supporting surface for tubular metallic test specimens 10 and 12. In the recess surface 14 of element 2 are located two apertures 16 and 18 communicating the exterior recess surface 14 to the hollow interior 6. Metallic, tubular test specimens 10 and 12 are maintained in electrically insulative relationship by means of O-ring 20 fabricated of an electrically non-conductive material. The terminal portion of element 2 is also threaded so that end cap 22 may be threaded onto the terminal portion via threads 24 of element 2 thereby providing a rigid, unitary structure inhibiting the axial movement of test specimens 10 and 12 and insulative O-ring 20. In this embodiment, electrical conductor lead wires 25 and 26 are secured to the undersurface of test specimens 10 and 12, respectively, by suitable methods; e.g. soldering. It is at once apparent that the interior surfaces of test specimens 10 and 12 substantially fluid-tightly engage the recess surface 14 of element 2. Electrical lead wires 25 and 26 extend out through the end 6 of element 2 for connection to the instantaneous corrosion rate meter.

Referring to FIGURE 2, the test specimen support is fabricated in a similar manner as that shown in FIGURE 1 with the exception that the various components are manufactured from material which is electrically conductive. In this embodiment, in order to achieve the necessary insulative relationship between test specimens 10 and 12 and the remainder of the probe support components, insulating cylindrical element 28, having apertures registering with those in element 2, is disposed on the recessed surface 14 of element 2 and insulative O-rings 30 and 32 are provided at the shoulder of the recess surface 14 adjacent test element 10 and at the shoulder 34 formed by end cap 22 adjacent test specimen 12. Obviously an insulative coating of plastic material may be utilized in lieu of element 28 to obtain the necessary insulative relationship.

Referring now to FIGURES 3 and 4, a preferred embodiment of the invention is depicted wherein the test probe is fabricated of electrically non-conductive materials which are inert to the corrosive environment and comprises a first annular, elongated hollow element 36 having at least one threaded end 38 and one end 40 adapted, as for instance by means of threads, to support the probe from the wall of a vessel confining a corrosive environment. Element 36 has at least two spaced apertures 42 and 44 communicating the exterior surface 46 to the hollow interior 48. A sleeve-like element 50 engages the first annular element 36 from at least end 41 to about the first aperture 42. The element 50 has one end of a smaller diameter than the end in juxtaposition to end 41 thereby forming shoulder 52 and a surface 54 substantially parallel with the axis of element 36. Yieldable electrical conductor means 56 and 58 are separately secured through each of apertures 42 and 44 respectively as by means of a cement or mechanical means. It is preferred that a cement or sealant be used which is inert to the corrosive environment so as to insure the isolation of the interior of hollow element 36 from the corrosive environment. The electrical conductor means 56 and 58 are positioned substantially normal to the axis of element 36 and are of sufficient length to extend at least to the plane defined by surface 54 of sleeve-like element 50. Yieldable conductor means or spring clips 56 and 58 are each respectively attached to lead wires 60 and 62 which extend to the support-adapted end 41 of element 36. A pair of semi-annular elements 64 and 66 are disposed to circumscribe that portion of element 36 between apertures 42 and 44 and have end grooved recesses 63 adapted to correspond to the configuration of the yieldable conductor means or spring clips 56 and 58 so as to insure rigid containment of the spring clips 56 and 58. The outside diameter of semi-annular elements 64 and 66 when joined together to circumscribe elongated element 36 is less than that of the smaller diameter of sleeve-like element 50. Annular tubular element 68 having an inside diameter slightly larger than the outside diameter of joined elements 64 and 66 is slidably disposed over semi-annular element 64 and 66 so as to contain same in an annular configuration and to restrain movement thereof. The exterior surface of element 68 is substantially co-planar and co-incident with the surface formed by the smaller diameter end of sleeve-like element 50 thereby providing a registered surface. A first annular gasket means 70, preferably of a resilient material, is slidably disposed adjacent the shoulder 52 of sleeve-like element 50. End annular element 72 having a shoulder 74 and a surface 76 substantially co-planar and co-incident with the smaller diameter of the sleeve-like element 50 provides the remainder of the supporting surface for tubular test specimens 78 and 80. Gasket means or O-ring 71 abuts shoulder 74 of element 72. Test specimens 78 and 80 have interior surfaces corresponding to the co-acting, co-planar surfaces of elements 50, 68 and 72. Electrically insulative means, such as O-ring 82, maintains metallic test specimens 78 and 80 in electrically insulative relationship. Annular end cap 84 engages the threaded terminus of element 36 at threaded end 38 and acting in conjunction wtih gasket means or O-ring 88 disposed in slot 90 in the end of annular end element 72 seals the interior 48 of element 36 from the corrosive environment. Annular end cap 84 also urges the slidably disposed elements toward one another so as to maintain all of the elements stationary as respects axial movement and to provide sufficient compressive forces to spring clips 56 and 58 urging their contact with the respective adjacent surfaces of the test specimens.

It is readily apparent that O-rings or gaskets 70, 71, 82 and 88 provide means whereby the hollow interior 48 of element 36 is isolated from the corrosive environment therby protecting electrical lead wires 60 and 62 from deterioration. For this reason it is preferred that they be fabricated of a resilient material which upon compression caused by threading end cap 84 onto element 36 will effect the desired fluid seals.

The component parts of the test probe as described may be made of various materials of construction according to the alternative embodiments depicted. It will, of course, be apparent that metal or metal alloys that are resistent to corrosive action of the environment in which the unit is to be used is preferred for the embodiment depicted in FIGURE 2, whereas suitable materials such as "Bakelite," "Lucite," "Teflon" and other substantially inert plastics may be utilized for the structures depicted in FIGURES 1, 3 and 4.

The various electrical contacts such as 56 and 58 are made of copper or other highly conductive metals. In general, these parts may be machined from materials of construction which are designed for use at relatively high pressures and temperatures and it is preferred that the material have some resiliency so that when the probe is assembled, the urging of the various elements together will force the conductors or spring clips into contact with the respective interior surfaces of the test specimens.

It will be apparent to those of ordinary skill in the art from this description that various modifications in the shape and design of the component parts of the apparatus depicted may be made without departing from the scope of the hereindisclosed invention. The outer and inner configuration of the various elements as well as their relative sizes depicted are not to be taken as limiting examples for these relationships are readily altered without departing from the spirit of the invention. For instance, the elements need not be annular in shape and means other than O-rings may be utilized to provide the necessary sealing and/or insulative relationship disclosed and means other than annular elements or segments may be utilized to obtain electrically insulating conditions wherever warranted as for instance by the use of insulative coatings of known materials, accordingly, the only limitations attached to the invention appear in the appended claims.

The embodiments of the invention in which an exclusive property or privilege is claimed are defined as follows:

1. A corrosion test probe comprising a hollow, tubular base member having one end adapted for supporting said probe in a confined corrosive environment and having an extending end having a recess on the exterior surface thereof, the surface of said recess being adapted to support at least two metallic test specimens so that at least the surfaces of said specimens opposite the surface adjacent the recess surface are exposed to said corrosive environment; said tubular base member having apertures communicating the recess surface thereof to the hollow interior, said apertures being spaced such that at least one aperture is aligned with each of at least two specimens; at least two metallic tubular test specimens slidably disposed on said recess surface, in registry with said apertures, and having substantially the same configuration and having interior surfaces conforming to the exterior configuration of said recess surface to substantially fluid-tightly engage at least a portion of said recess surface so as to isolate same from said corrosive environment; electrically non-conductive means disposed between said test specimens; independent electrical conductor means contacting each of the unexposed interior surfaces of said test specimens and communicating into and through the hollow interior of said base member through apertures located in the isolated portion of said recess surface; end means on the terminal portion of said extending end to prevent relative longitudinal movement between said base member and said test specimens and to fluid-tightly seal the hollow interior of said base member from said corrosive environment; and electrically non-conductive means disposed to each of the ends of said recess.

2. A probe in accordance with claim 1 wherein said base member and end means are of an electrically non-conductive material and said electrical conductive means include spring contact means secured to said base member which upon compression caused by said end means on the terminal portion of said extending end make contact with said unexposed interior surfaces of said test specimens.

3. A corrosion test probe comprising a first annular, elongated, hollow element having at least one threaded end, and one end adapted to support said probe from the wall of a vessel confining a corrosive environment, said element having two spaced apertures communicating the exterior surface and hollow interior thereof; a sleeve-like element engaged on said first element from the support-adapted end to about the first aperture relative to said end, said sleeve-like element having a smaller diameter at the end adjacent said aperture to form a shoulder and a surface substantially parallel with the axis of said first element; yieldable electrical conductor means separately secured through each of said apertures and connected to conductors extending at least to said support-adapted end; a pair of semi-annular elements disposed between said yieldable electrical conductor means and having recess grooves on the ends thereof corresponding to the configuration of said yieldable electrical conductor means and having an outside surface of lesser diameter than the smaller diameter end of said sleeve-like element; an annular element slidably engaged over said pair of semi-annular elements and being of the same diameter as the smallest diameter of said sleeve-like element so that the outside surface thereof substantially registers with the surface of the smaller diameter surface of said sleeve-like element; a first annular gasket means slidably disposed adjacent the shoulder of said sleeve-like element; an end annular element having a shoulder and defining a surface co-planar and substantially co-incident with the smaller diameter of said sleeve-like element; two tubular metallic specimens having an inside surface corresponding to the co-acting, co-planar surfaces of said elements disposed on said surfaces; electrically non-conductive means disposed between said specimens and between the specimens and the co-acting, co-planar surfaces; a second annular gasket means slidably disposed on said co-planar surfaces abutting the shoulder of said end annular element and an end cap annular element secured to the threaded terminus of said first hollow element to prevent axial movement between said elements.

4. The probe in accordance with claim 3 having two metallic test specimens wherein said first and second annular gasket means are resilient O-rings of an electrically non-conductive material and a third O-ring of said same material is disposed between said specimens.

5. The probe in accordance with claim 4 wherein said end annular element has a recess groove in the end thereof relative to said end cap in which is disposed a gasket means to isolate the terminal portion of said first hollow element from said corrosive environment.

6. The probe in accordance with claim 5 wherein all of said elements are of an electrically non-conductive material.

7. The probe in accordance with claim 6 wherein said yieldable electrical conductor means are spring clips which upon threading of said end cap onto said threaded end of said hollow element make contact with the respective interior surfaces of said specimens disposed in juxtaposition thereto.

8. The probe in accordance with claim 7 wherein said conductor extending the length of said first element are lead wires secured to the ends of said yieldable electrical conductor means.

9. The probe in accordance with claim 8 wherein said yieldable electrical conductor means are secured through said apertures by means of fluid-impermeable cement and said cement forms a fluid-tight seal around said apertures.

References Cited

UNITED STATES PATENTS 2,987,672   6/1961   Marsh et al. _____ 324—71

FOREIGN PATENTS 653,782   12/1962   Canada.

RICHARD C. QUEISSER, *Primary Examiner.*

H. GOLDSTEIN, *Assistant Examiner.*